(12) United States Patent
Rice et al.

(10) Patent No.: US 8,796,888 B2
(45) Date of Patent: Aug. 5, 2014

(54) WEARABLE POWER MANAGEMENT SYSTEM

(75) Inventors: Jonathan Rice, Whitmore Lake, MI (US); Thomas Waters, Traverse City, MI (US); Jason Krajcovic, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 906 days.

(21) Appl. No.: 12/885,597

(22) Filed: Sep. 20, 2010

(65) Prior Publication Data

US 2012/0007432 A1 Jan. 12, 2012

Related U.S. Application Data

(60) Provisional application No. 61/362,204, filed on Jul. 7, 2010.

(51) Int. Cl.
*H05K 7/14* (2006.01)
*H02J 7/35* (2006.01)
*H02J 1/00* (2006.01)
*H02J 1/12* (2006.01)
*H02J 7/34* (2006.01)

(52) U.S. Cl.
CPC ... *H02J 1/00* (2013.01); *H02J 7/35* (2013.01); *H02J 1/12* (2013.01); *H02J 7/34* (2013.01); *H02J 2001/004* (2013.01)
USPC ............................................. 307/149

(58) Field of Classification Search
CPC ...................................... H02J 1/00; H02J 7/35
USPC ................... 307/43, 147, 149; 323/259, 344; 363/74, 101; 713/320, 323
See application file for complete search history.

(56) References Cited

U.S. PATENT DOCUMENTS 3,065,537 A 11/1962 Patriarca et al.
3,124,487 A 3/1964 Duddy (Continued)

FOREIGN PATENT DOCUMENTS

DE 19907369 A1 8/2000
FR 2876503 A 4/2006

(Continued)

OTHER PUBLICATIONS

"Elastic Properties and Young Modulus for some Materials", The Engineering ToolBox (http://www.engineeringtoolbox.com/young-modulus-d_417.html). Accessed on: Mar. 26, 2013.

(Continued)

*Primary Examiner* — Rexford Barnie
*Assistant Examiner* — Rasem Mourad
(74) *Attorney, Agent, or Firm* — Endurance Law Group, PLC (57) ABSTRACT

The present disclosure sets forth a power management system including a plurality of power management devices configured to transfer power among a plurality of external devices. The power management system includes a first power management device and a second power management device. The first power management device includes a first, second and third communication ports along with first, second and third power ports. The second power management device includes fourth, fifth and sixth communications port along with fourth, fifth and sixth power ports. The first power port of the first power management device is coupled to the fourth power port of the second power management device such that first and second power and the first communications port of the first power management device is coupled to the fourth communications port of the second power management device.

10 Claims, 6 Drawing Sheets

(56) References Cited

U.S. PATENT DOCUMENTS

| | | | |
|---|---|---|---|
| 3,668,010 A | 6/1972 | Fally et al. | |
| 4,195,328 A * | 3/1980 | Harris, Jr. | 362/549 |
| 4,278,584 A | 7/1981 | Noguchi et al. | |
| 4,374,184 A | 2/1983 | Somers et al. | |
| 4,395,468 A | 7/1983 | Isenberg | |
| 4,400,022 A | 8/1983 | Wright | |
| 4,709,521 A | 12/1987 | Walz | |
| 4,728,584 A | 3/1988 | Isenberg | |
| 4,902,249 A | 2/1990 | Morishita et al. | |
| 5,273,839 A | 12/1993 | Ishihara et al. | |
| 5,458,989 A | 10/1995 | Dodge | |
| 5,496,655 A | 3/1996 | Lessing | |
| 5,686,198 A | 11/1997 | Kuo et al. | |
| 5,742,149 A | 4/1998 | Simpson | |
| 5,863,671 A | 1/1999 | Spear, Jr. et al. | |
| 6,348,278 B1 | 2/2002 | Lapierre et al. | |
| 6,467,509 B1 | 10/2002 | Iio et al. | |
| 6,476,581 B2 * | 11/2002 | Lew | 320/107 |
| 6,562,496 B2 | 5/2003 | Faville et al. | |
| 6,602,626 B1 | 8/2003 | Allen | |
| 6,677,066 B1 | 1/2004 | Jansen et al. | |
| 6,780,048 B2 * | 8/2004 | Chen et al. | 439/502 |
| 6,875,535 B2 | 4/2005 | Ye et al. | |
| 7,116,079 B2 | 10/2006 | Bayne et al. | |
| 7,229,712 B2 | 6/2007 | Eshraghi et al. | |
| 7,374,835 B2 | 5/2008 | Kendall et al. | |
| 7,629,069 B2 | 12/2009 | Finnerty | |
| 7,767,353 B2 | 8/2010 | Konoto et al. | |
| 7,956,573 B1 | 6/2011 | Rosen | |
| 8,343,689 B2 | 1/2013 | Crumm et al. | |
| 2001/0053465 A1 | 12/2001 | Fuglevand | |
| 2003/0003332 A1 | 1/2003 | Sederquist et al. | |
| 2003/0064275 A1 | 4/2003 | Morse et al. | |
| 2003/0134170 A1 | 7/2003 | Sarkar et al. | |
| 2003/0138683 A1 | 7/2003 | Bai et al. | |
| 2003/0143445 A1 | 7/2003 | Daniel et al. | |
| 2003/0162067 A1 | 8/2003 | McElroy | |
| 2003/0235725 A1 | 12/2003 | Haltiner et al. | |
| 2003/0235741 A1 | 12/2003 | Richardson et al. | |
| 2004/0048120 A1 | 3/2004 | Haltiner et al. | |
| 2004/0115503 A1 | 6/2004 | Jacobson et al. | |
| 2004/0121222 A1 | 6/2004 | Sarkar et al. | |
| 2004/0166391 A1 | 8/2004 | Nakamura et al. | |
| 2004/0175598 A1 | 9/2004 | Bliven et al. | |
| 2004/0202900 A1 | 10/2004 | Pavio et al. | |
| 2004/0222638 A1 * | 11/2004 | Bednyak | 290/1 R |
| 2004/0247964 A1 | 12/2004 | Sadamoto et al. | |
| 2004/0247972 A1 | 12/2004 | Kendall et al. | |
| 2005/0026028 A1 | 2/2005 | Ouchi et al. | |
| 2005/0037246 A1 | 2/2005 | Hunkel et al. | |
| 2005/0053809 A1 | 3/2005 | Hayashi et al. | |
| 2005/0112452 A1 | 5/2005 | Crumm et al. | |
| 2005/0123810 A1 | 6/2005 | Balan | |
| 2005/0123813 A1 | 6/2005 | Matoba et al. | |
| 2005/0147857 A1 | 7/2005 | Crumm et al. | |
| 2005/0233187 A1 | 10/2005 | Pastula et al. | |
| 2006/0024547 A1 | 2/2006 | Waldbillig et al. | |
| 2006/0063044 A1 | 3/2006 | Devries | |
| 2006/0170391 A1 | 8/2006 | Lam | |
| 2006/0192523 A1 | 8/2006 | Nomoto | |
| 2006/0216540 A1 | 9/2006 | Budinger et al. | |
| 2006/0228593 A1 | 10/2006 | Grieve et al. | |
| 2006/0246329 A1 | 11/2006 | Gopal et al. | |
| 2007/0048578 A1 | 3/2007 | Tokoi et al. | |
| 2007/0119638 A1 | 5/2007 | Grieve | |
| 2007/0141447 A1 | 6/2007 | Crumm et al. | |
| 2007/0188130 A1 | 8/2007 | Scheucher | |
| 2007/0224481 A1 | 9/2007 | Suzuki et al. | |
| 2007/0231631 A1 | 10/2007 | Venkataraman | |
| 2007/0243444 A1 | 10/2007 | Zheng et al. | |
| 2007/0259218 A1 | 11/2007 | Tung et al. | |
| 2008/0179955 A1 | 7/2008 | Nakashima et al. | |
| 2008/0241612 A1 | 10/2008 | Ballantine et al. | |
| 2009/0068446 A1 | 3/2009 | Bischof et al. | |
| 2009/0128087 A1 | 5/2009 | Ohmori | |
| 2010/0134077 A1 * | 6/2010 | Krajcovic | 323/234 |
| 2010/0173208 A1 | 7/2010 | Hatada | |
| 2010/0183937 A1 | 7/2010 | Halloran et al. | |
| 2011/0278957 A1 * | 11/2011 | Eckhoff et al. | 307/150 |
| 2012/0174299 A1 * | 7/2012 | Balzano | 2/463 |

FOREIGN PATENT DOCUMENTS

| | | |
|---|---|---|
| JP | 6096787 A | 4/1994 |
| JP | 2005515585 A | 5/2005 |
| JP | 2007026891 A | 2/2007 |
| JP | 2007323904 A | 12/2007 |
| WO | 0002283 A | 1/2000 |

OTHER PUBLICATIONS

"Supercharger." Webster's Third New International Dictionary, Unabridged. Merriam-Webster, Incorporated, 1993. Web. Accessed on: Aug. 5, 2013.

Derwent Abstract for Suzuki, JP 2007-026891 A.

FS100UMJ data sheet.

Giraud et al., "Young's modulus of some SOFCs materials as a function of temperature", Journal of the European CeramicSociety 28 {2008), pp. 77-83.

MC68HC705P6A data sheet.

Sammes et al., "Design and Fabrication of a 100 W anode supported micro-tubular SOFC stack", 2005, Journal of Power Sources, 145, p. 428-434.

* cited by examiner

WEARABLE POWER MANAGEMENT SYSTEM

RELATED APPLICATIONS

The invention claims priority to U.S. Provisional Application No. 61/362,204 entitled WEARABLE POWER MANAGEMENT SYSTEM, which is hereby incorporated by reference herein.

TECHNICAL FIELD

The invention relates to an electric power management system.

BACKGROUND

The material presented in this section merely provides background information to the present disclosure and may not constitute prior art.

Batteries are typically utilized to meet energy demands of portable electronic devices. However, the amount of batteries that can be carried and utilized by a person is limited by size, weight and cost. In military exercises, portable electronic devices can increase a soldier's effectiveness. These portable electronic devices can include mission critical devices such as tactical radios, global positioning system ("GPS") devices, night vision goggles, laser range finders, target designators, lights, and laptop or handheld computers. Such portable electronic devices can consume high energy levels, especially during extended mission durations. Batteries providing power to these devices have become a significant weight burden.

Energy conversion devices can be utilized in conjunction with power management apparatuses to reduce the size, weight and cost burden of batteries. Energy conversion devices such as generators, photovoltaic cells and fuel cells can be utilized to recharge batteries in portable applications, thereby providing large cost, weight, and volume savings. Power management apparatuses can manage electrical parameters such as electrical voltage, electrical current and electrical power levels when transferring electrical energy among multiple devices. The power management apparatus can include a buck boost converter to convert electrical parameters. Buck boost converters are DC-DC converter that can provide an output voltage that is a selected conversion magnitude greater than or less than an input voltage. The selected conversion magnitude can be determined by a control system based on sensed inputs and selected electrical parameter outputs to thereby accommodate devices having differing electrical parameter requirements. Power management apparatuses can measure an input electrical current level or an input electrical voltage level to convert the electrical current level or the electrical voltage level to a desired output electrical current level or output electrical voltage level. A controller can be utilized to monitor the input electrical current and voltage levels and to determine buck boost converter commands based on the input electrical current and electrical voltage levels.

Typically, energy conversion devices and power management apparatuses require a specific position and orientation in order to operate effectively. Thus, the energy conversion devices and power management apparatuses cannot be operated while a soldier is moving on foot. The process for utilizing these energy conversion devices to charge a battery includes human interaction and several steps including unhooking the battery from the power consuming device, charging the battery, and reattaching the battery to the power consuming device. Further, recharging a battery utilizing current power manager apparatuses requires cumbersome equipment including power cables, power management circuitry, and direct voltage conversion electronics.

Therefore, improved power management apparatuses are needed.

SUMMARY

The present disclosure sets forth a power management system including a plurality of power management devices configured to transfer power among a plurality of external devices. The power management system includes a first power management device and a second power management device. The first power management device includes first, second and third communication ports along with first, second and third power ports. The first power management device further includes a first communications bus and a first power bus, wherein the first, second, and third power ports are configured to electrically connect external power devices to the communications bus and wherein the first, second and third power ports are configured to electrically connect the external power devices to the power bus. The second power management device includes fourth, fifth and sixth communications port along with fourth, fifth and sixth power ports. The second power management device, further includes a second communications bus and a second power bus, wherein the fourth, fifth, and sixth power ports are configured to electrically connect a first external power device to the communications bus and wherein the first, second and third power ports are configured to electrically connect the external power devices to the power bus. The first power port of the first power management device is coupled to the fourth power port of the second power management device such that the first and second power buses are electrically connected and the first communications port of the first power management device is coupled to the fourth communications port of the second power management device such that the first communications bus and the second communications bus are signally connected.

DESCRIPTION

Figures 1, 2:
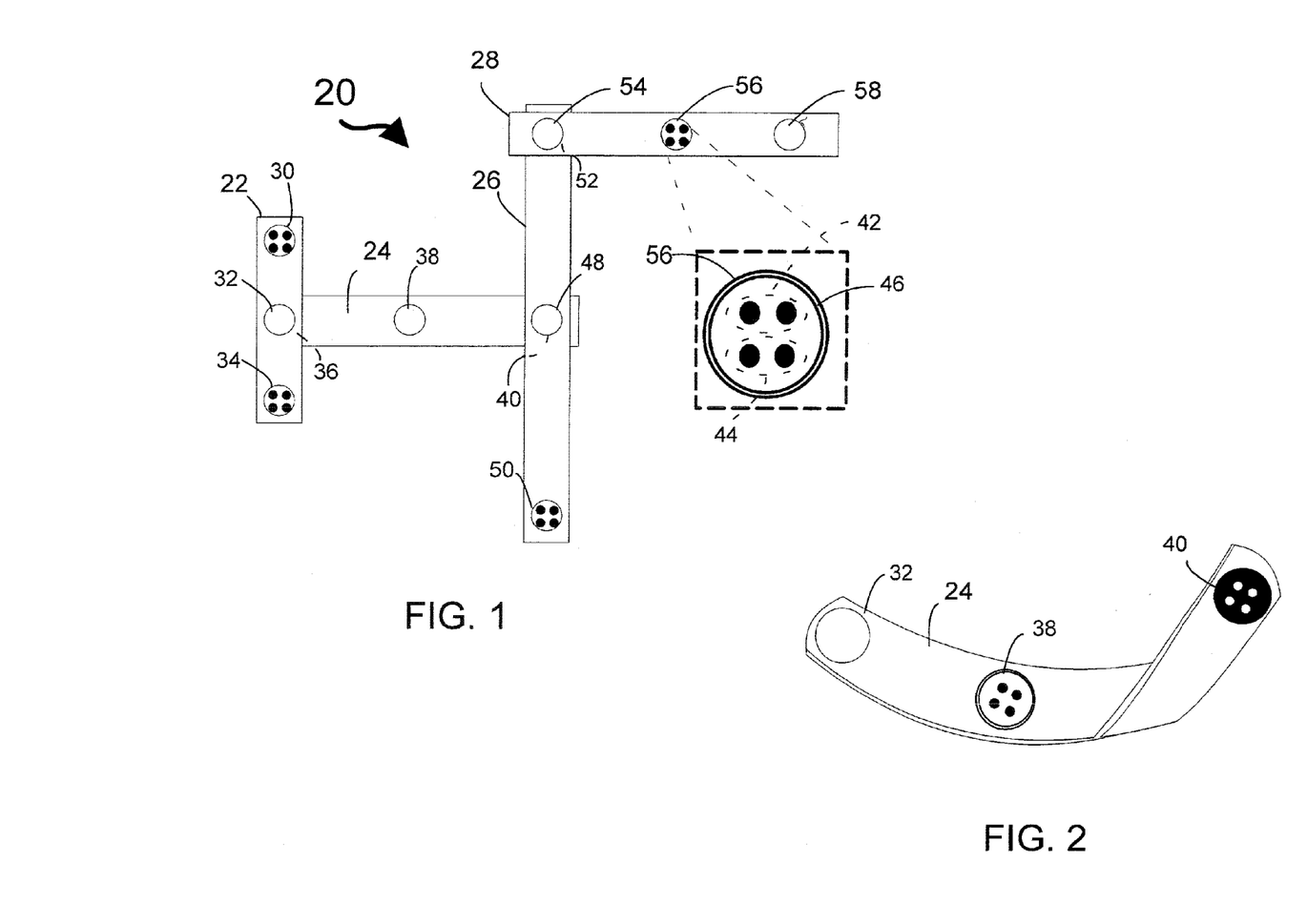
FIG. 1 is a top view of a power management system in accordance with an exemplary embodiment of the present disclosure.
FIG. 2 is a prospective view of a power management device of the power management system of FIG. 1.

Referring to FIG. 1, a power management system 20 includes a power management device 22, a power management device 24, a power management device 26, and a power management device 28. The power management device 22 includes a power and communications port 30, a power and communications port 32, and a power and communications port 34. The power management device 24 includes a power and communications port 36, a power and communications port 38, and a power and communications port 40. The power management device 26 includes a power and communications port 52, a power and communications port 48, and a power and communications port 50. The power management device 28 includes a power and communications port 54, a power and communications port 56, and a power and communications port 58.

Each power management device 22, 24, 26, and 28 comprises a substantially flat, flexible strap-shaped geometry having different lengths such that the power management system can be configured for various user applications. The representative power management device 24 depicted in both FIGS. 1 and 2, comprises the power ports 36 and 40 on a first side and the power port 38 on a second side of the power management device 24. The power management device 24 can have electronics such as electronics discussed further with reference to FIG. 4, embedded within a mechanical flexible outer material. Exemplary outer materials include plastic, fibers (for example, synthetic and natures materials such as those utilized in clothing material), rubber and like materials.

Each of the power and communications port of the power management devices 22, 24, 26, and 28 depicted in FIG. 1 can be coupled to an oppositely configured power and communications port of another power management device. A representative configuration is depicted in FIG. 1, wherein, the power and communications port 32 of the first power management device 22 is coupled to the power and communications port 36 of the second power management device 24, the power and communications port 40 of the second power management device 24 is coupled to the power and communications port 48 of the third power management device 26, and the power and communications port 52 of the third power management device 26 is coupled to the power and communications port 54 of the fourth power management device 28.

As represented the "zoom" depiction of power and communications port 56 of FIG. 1, each power and communications port 56 includes a power portion 42, a communications portion 44, and an attachment portion 46. The exemplary attachment portion 46 comprises a snap tolerant fit for mating with a portion of an oppositely configured power and communications port.

Figure 3:
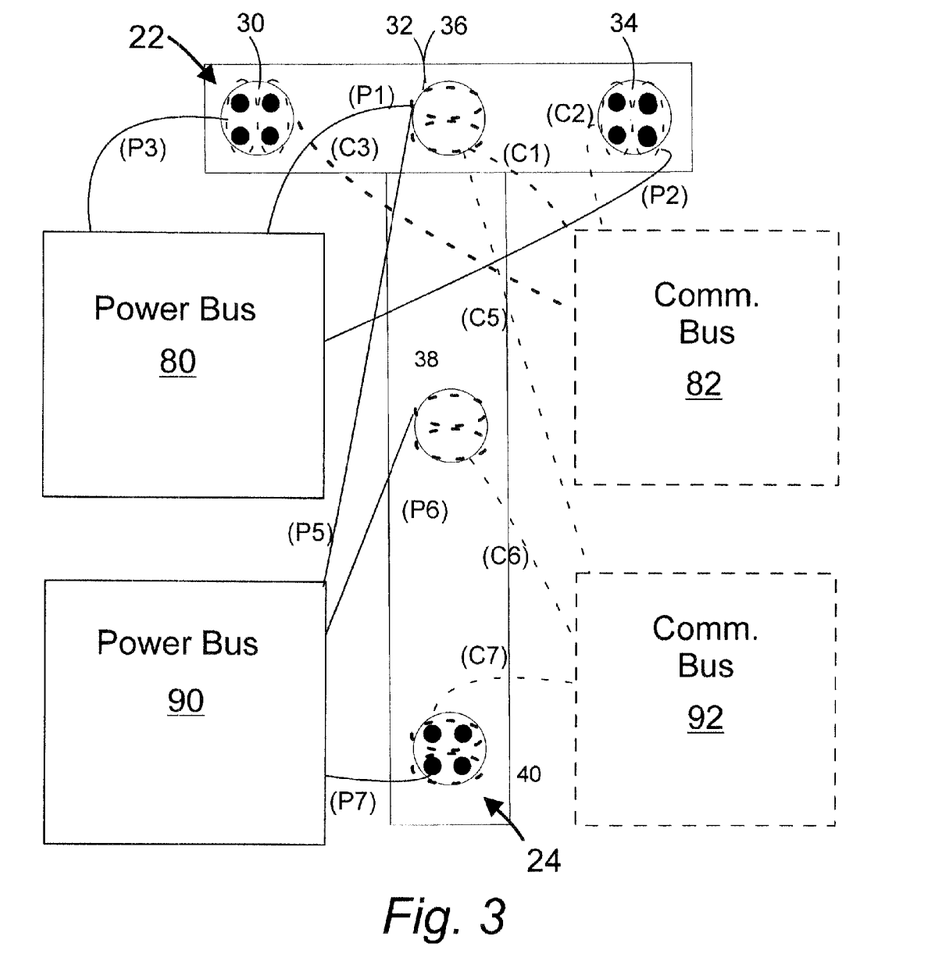
FIG. 3 is a combined top view and schematic diagram of a first portion of the power management system of FIG. 1.

FIG. 3 depicts power routing among the power portions and the communications portions of the power and communications ports 30, 32, 34, 36, 38, and 40 as solid lines labeled ('P1'), ('P2'), ('P3'), ('P4'), ('P5') and ('P6'), respectively and further depicts communications routing among the communications portions of the power and communication ports 30, 32, 34, 36, 38, and 40 as dashed lines labeled ('C1'), ('C2'), ('C3'), ('C4'), ('C5') and ('C6'), respectively. Further, FIG. 3 schematically depicts the power bus 80, the power bus 90, the communications bus 82, and the communications bus 92. The power bus 80 comprises a network of power wires embedded within the first power management device 22. The power bus 90 comprises a network of power wires embedded within the second power management device 24. The communications bus 82 comprises a network of data routing wires embedded within the first power management device 22. The communications bus 92 comprises a network of data routing wires embedded within the second power management device 24.

Since power and communications ports 30, 32, and 34 transfer power to and receive power from the power bus 80, and the power and communications ports 36, 38, and 40 transfer power to and receive power from the power bus 90, the interconnection between the power and communications port 32 and the power and communications port 36 electrically couples the power bus 80 and power bus 90 allowing power sharing therebetween. Likewise, since power and communications ports 30, 32, and 34 transfer signals to and receive signals from the communications bus 82, and the power and communications ports 36, 38, and 40 transfer signals to and receive signals from the power bus 92, the interconnection between the power and communications port 32 and the power and communications port 36 as depicted in FIG. 3 signally couples the communications bus 82 and communications bus 92 allowing communications sharing therebetween.

Figure 4:
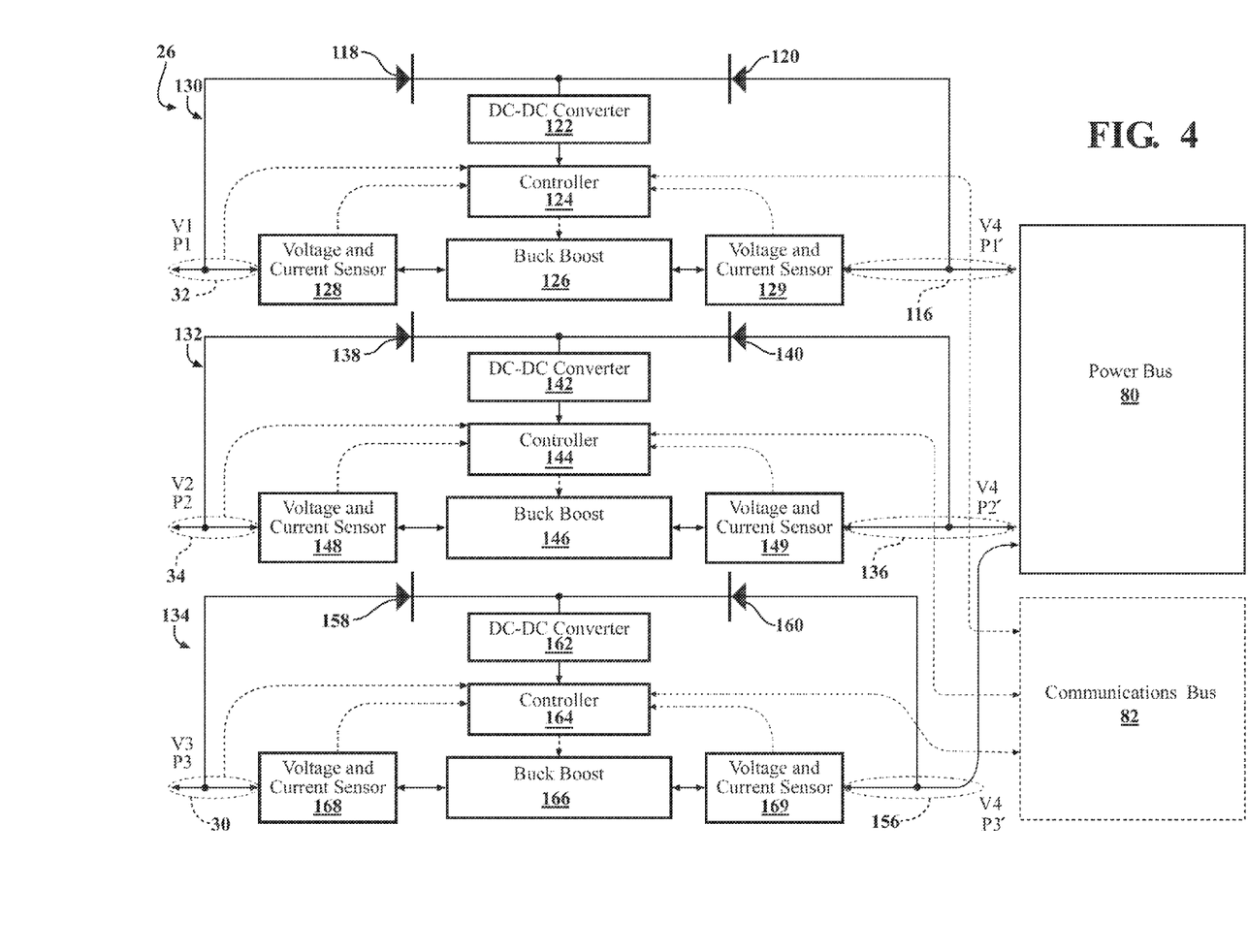
FIG. 4 is a schematic view of a second portion of the power management system of FIG. 1.

Referring to FIG. 4, electronics embedded within the power management devices includes a buck boost module 130, a buck boost module 132, and a buck boost module 134. The buck boost module 130 includes a diode 118, a diode 120, a voltage converter 122, a controller 124, a buck boost circuit 126, a voltage and current sensor 128, and a voltage and current voltage sensor 129. The buck boost converter module 130 converts a voltage V1 from the second power port 32 to a power bus voltage V4 at an electrical lead 116, wherein the difference in power between the power at the power and communications port 32 (P1) and power at the electrical lead 116 (P1') results from energy conversion loses and from power provided to operate buck boost module 130 components such as the controller 124.

The buck boost module 132 includes a diode 138, a diode 140, a voltage converter 142, a controller 144, a buck boost circuit 146, a voltage and current sensor 148, and a voltage and current voltage sensor 149. The buck boost converter module 132 converts a voltage V2 from the second power port 34 to a power bus voltage V4 at an electrical lead 136, wherein the difference in power between the power at the power and communications port 34 (P2) and power at the electrical lead 136 (P2') results from energy conversion loses and from power provided to operate buck boost module 132 components such as the controller 144.

The buck boost module 134 includes a diode 158, a diode 160, a voltage converter 162, a controller 164, a buck boost circuit 166, a voltage and current sensor 168, and a voltage and current voltage sensor 169. The buck boost converter module 134 converts a voltage V3 from the third power port 30 to a power bus voltage V4 at an electrical lead 156, wherein the difference in power between the power at the power and communications port 30 (P3) and power at the electrical lead 156 (P3') results from energy conversion loses and from power provided to operate buck boost module 134 components such as the controller 164.

It is to be noted, that each of the buck boost modules 130, 132, and 134 are bi-directional in that each buck boost modules 130, 132, and 134 can be powered from one of the power ports 30, 32 and 34, respectively or can be powered from the power bus 80. The electronic component and design architecture described for the buck boost modules 130, 132, and 134 is substantially similar to that described in U.S. Patent Application Publication Number 20100134077 entitled POWER MANAGEMENT APPARATUS WITH BUCK BOOST CONVERTER MODULE the entire contents of which is hereby incorporated by reference, herein.

Each power and communications port described herein is configured to couple with external power devices to transfer power and signals between each external devices and the power and communications port. The term "external power device" as used in this context can refer to other power management devices within the power management system or can refer to any device that provides, consumes, or transports power, wherein exemplary external power devices include tactical radios, global positioning system ("GPS") devices, night vision goggles, laser range finders, target designators, lights, and laptop or handheld computers, generators, batteries, photovoltaic cells, and fuel cells.

Figure 5:
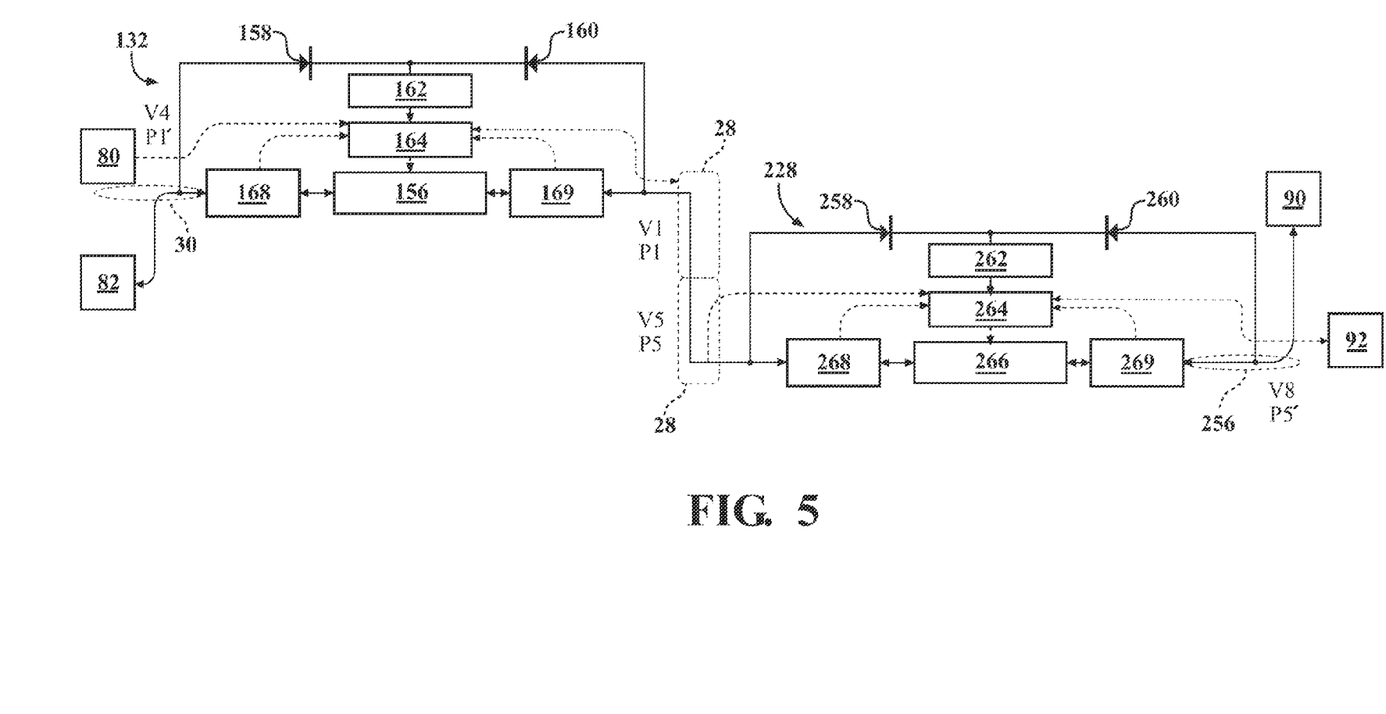
FIG. 5 is a schematic diagram of a third portion of the power management system of FIG. 1.

FIG. 5 depicts the buck boost module 132 of the power management device 22 and a buck boost module 228 of the power management device 24 electrically and signally through coupling of the power and communications ports 32 and 36. Power is routed between the power bus 80 and the power bus 90 through the buck boost module 132 and the buck boost module 228. Further, signals are routed between the communications bus 82 and the communications bus 92 through the buck boost module 132 and the buck boost module 228.

Figure 6:
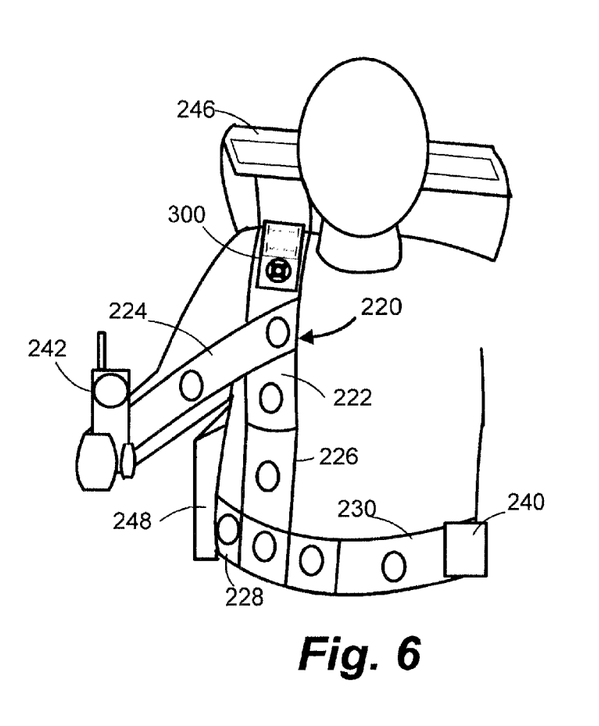
FIG. 6 is a prospective view of a wearable power management system in accordance with another exemplary embodiment of the present disclosure.

FIG. 6 depicts a power management system 220 comprising a power management device 222, a power management device 224, a power management device 226, a power management device 228, and a power management device 230. Each of the power management devices 220, 224, 226, 228, and 230 are substantially similar to the power management devices previously described (for example, power management device 22) and allow power transfer and communication therebetween utilizing components as described with reference to power management system 20. The power management system 220 further comprises a battery 240, a photovoltaic cell 246, a fuel cell 248, a radio transmitter 242, and a user interface 300, each coupled to a power and communications ports of the one of the power management devices 220, 224, 226, 228, and 230. The power manager 220 is wearable in it can be securely attached to a user's body. In one embodiment, the power management system 220 is attached to a user using a shoulder support strap. In other embodiments, the power management system can be attached to or support by other parts of the user.

Figure 7:
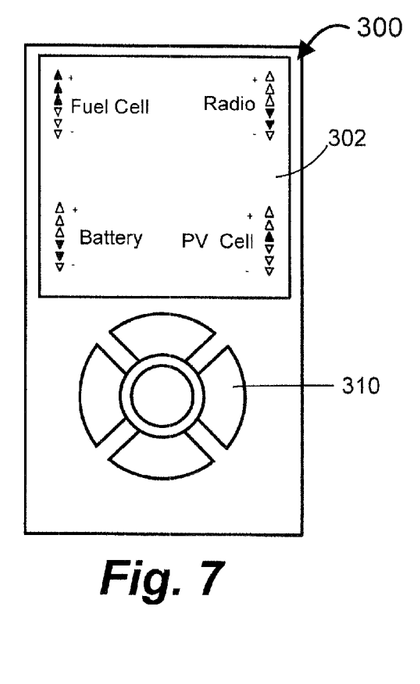
FIG. 7 is a user interface of the power management system of FIG. 6.

FIG. 7 depicts the user interface 300 including a display 302 and an input component 310. The display 302 depicts power transfer levels between each device inputting power to and receiving power from the power from the power management devices 220, 224, 226, 228, and 230 of the power management system 200. The input component 310 allows a user to monitor power levels, select power levels, and select power priority among components of the power management system 220. In one embodiment, the power management allows a user to prioritize components utilizing hybrid power levels as described in U.S. Patent Application Publication Number 2010/0134077 the entire contents of which is hereby incorporated by reference herein. Other user interfaces may be utilized to manage the power management system 220. In one embodiment, a master control interface (not shown) or a laptop computer (not shown) can provide user interface control to the power management system 220. In one embodiment, the user interface 300 provides high level control, wherein a second user interface can provide enhanced control features. In one embodiment, the user interface 300 comprises a wireless transmitter and can communicate with a wireless receiver of the power management system 220 such that the user interface does not require attachment to communicate with other components of the power management system 220 and to manage power with the power management system 220.

Figures 8, 9:
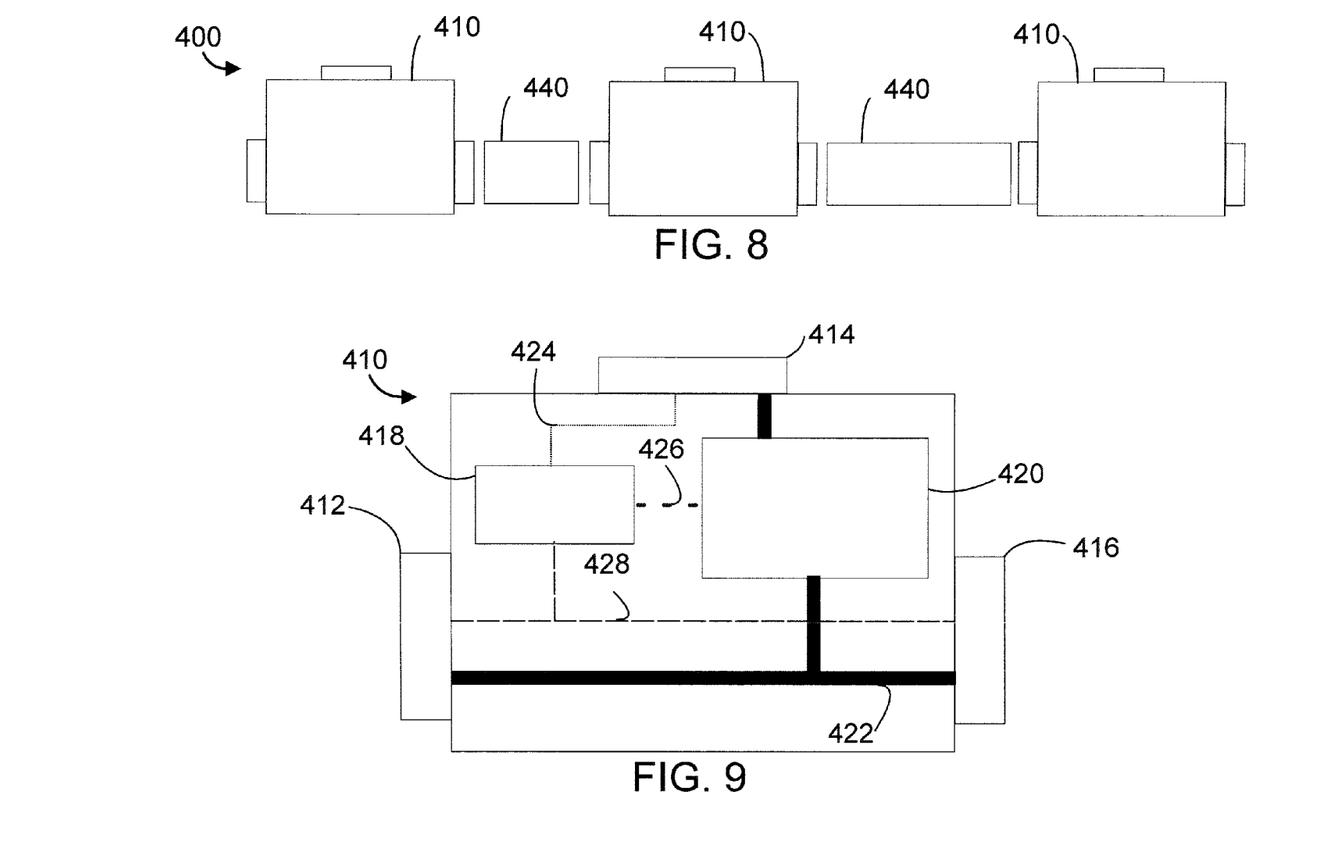
FIG. 8 is a portable power management system in accordance with another exemplary embodiment of the present disclosure.
FIG. 9 is a portable power management device of the portable power management system of FIG. 8.

Referring to FIGS. 8 and 9, a fuel cell system 400 of another exemplary embodiment of the present disclosure is shown. The fuel cell system 400 includes power management devices 410 electrically and signally interconnected through power and signal cables 440. Each power management device 410 includes a power and communications port 414 configured to receive an external device at any voltage within a predetermined voltage range and power and power and communications ports 412 and 416 configured to interconnect with other power management devices. Each power management device 410 further includes a controller 418, a voltage converter 420, signal routing wires 424, 426, and 428; and power routing wires 421 and 422.

The power management device 410 can provide power and signal connection to an external device through the external device port 414 such that signals from the external device are routed to the controller 418. The controller 418 can utilize the signal from the power and communications port 414 to command a desired voltage conversion level through the voltage converter 420 to appropriately convert power between a voltage of the external device connected to the power port 414 and that of the power routing wire 422. In an exemplary embodiment, the voltage of the power routing 422 represents a voltage of a common power bus of the fuel cell system 400.

The exemplary embodiments shown in the figures and described above illustrate, but do not limit, the claimed invention. It should be understood that there is no intention to limit the invention to the specific form disclosed; rather, the invention is to cover all modifications, alternative constructions, and equivalents falling within the spirit and scope of the invention as defined in the claims. Therefore, the foregoing description should not be construed to limit the scope of the invention.

What is claimed is:

1. A wearable power management apparatus comprising:
an elongated wearable portion comprising a generally flat flexible strap-shaped geometry configured to be worn by a human user, the elongated wearable portion including a mechanically flexible outer material;
a first power and communications port disposed directly on the wearable portion at a first discrete location;
a second power and communications port disposed directly on the wearable portion at a second discrete location, the second discrete location being spaced along the strap-shaped geometry of the elongated wearable portion apart from the first power and communications port by an intervening portion of the mechanically flexible outer material;
a first electrical lead embedded in the wearable portion for routing electrical current at a first electrical lead electric potential level, to and from the first power port;
a first electrical parameter sensor embedded in the wearable portion and configured to measure a first electrical lead electrical parameter to and from the first power port;
a second electrical lead embedded in the wearable portion for routing electrical current at a second electrical lead electric potential level;
a second electrical parameter sensor embedded in the wearable portion and configured to measure the second power electrical parameter;
a buck boost converter electrically coupled to both the first electrical lead and the second electrical lead, the buck boost converter being configured to convert electrical current between the first electrical lead electric potential level and the second electrical lead electric potential level at a controlled potential conversion level;
a controller being configured to receive operating current from either one of the first electrical lead and the second electrical lead, the controller configured to monitor the first electrical parameter sensor and the second electrical parameter sensor and being configured to output control signals to the buck boost converter, said control signals being determined based on the first electrical lead electrical parameter and the second electrical lead electrical parameter.

2. The wearable power management apparatus as set forth in claim 1, wherein a combined port comprises the first power and the first communication port, the combined power and communications port comprises a snap fitting.

3. The power management system of claim 1, further comprising a first voltage converter configured to convert a first power port potential difference to a first power bus potential difference.

4. The power management system of claim 3, wherein the voltage converter is configured to convert the first power port potential difference to the first power bus potential difference based on a signal communicated through the first power port.

5. The power management system of claim 4, further comprising a second voltage converter configured to convert a second power port potential difference to the first power bus potential difference.

6. The power management system of claim 5, further comprising a third voltage converter configured to convert a third power port potential difference to the first power bus potential difference.

7. The power management system of claim 6, wherein the controller is signally connected to the first power and communications port, the second power and communications port, and a third power and communication port, the first voltage converter, the second voltage converter, and the third voltage converter.

8. The power management system of claim 7, further comprising a master control device electrically connected to the first power port and the first communications port, a power consuming device electrically connected to the second power port and the second communications port, and power providing device electrically and signally connected to the third power port and the third communications port.

9. The power management system of claim 1, wherein the wearable portion includes a shoulder coupling portion.

10. A configurable wearable power management apparatus comprising:
at least two elongated wearable portions,
each elongated wearable portion comprising:
a) a mechanically flexible outer material configured to be worn by a human user;
b) a first power and communications port disposed directly on the wearable portion at a first discrete location;
c) a second power and communications port disposed directly on the wearable portion at a second discrete location spaced apart from the first power and communications port by an intervening portion of mechanically flexible outer material;
d) a first electrical lead for routing electrical current at a first electrical lead electric potential level, to and from the first power port;
e) a first electrical parameter sensor configured to measure a first electrical lead electrical parameter to and from the first power port;
f) a second electrical lead for routing electrical current at a second electrical lead electric potential level;
g) a second electrical parameter sensor configured to measure the second power electrical parameter;
h) a buck boost converter electrically coupled to both the first electrical lead and the second electrical lead, the buck boost converter being configured to convert electrical current between the first electrical lead electric potential level and the second electrical lead electric potential level at a controlled potential conversion level;
i) a controller being configured to receive operating current from either one of the first electrical lead and the second electrical lead, the controller configured to monitor the first electrical parameter sensor and the second electrical parameter sensor and being configured to output control signals to the buck boost converter, the control signals being determined based on the first electrical lead electrical parameter and the second electrical lead electrical parameter;

and wherein the first and second power and communications port of one elongated wearable portion are operatively connectable to either of the first and second power and communications ports of the other elongated wearable portion such that the two elongated wearable portions are configurable with respect to one another as a unitary power management apparatus worn by the human user.

\* \* \* \* \*